US012502902B2

(12) United States Patent
Tanaka et al.

(10) Patent No.: US 12,502,902 B2
(45) Date of Patent: Dec. 23, 2025

(54) RECORDING DEVICE

(71) Applicant: SEIKO EPSON CORPORATION, Tokyo (JP)

(72) Inventors: Yoshiyuki Tanaka, Matsumoto (JP); Nobuhisa Nomoto, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 32 days.

(21) Appl. No.: 18/600,649

(22) Filed: Mar. 9, 2024

(65) Prior Publication Data

US 2024/0300253 A1 Sep. 12, 2024

(30) Foreign Application Priority Data

Mar. 10, 2023 (JP) ................................ 2023-037306

(51) Int. Cl.
*B41J 29/02* (2006.01)
*B41J 2/175* (2006.01)
*B41J 29/56* (2006.01)

(52) U.S. Cl.
CPC ............ *B41J 29/56* (2013.01); *B41J 2/1752* (2013.01); *B41J 29/02* (2013.01)

(58) Field of Classification Search
CPC ................................ B41J 2/1752; B41J 29/02
See application file for complete search history.

(56) References Cited

U.S. PATENT DOCUMENTS 9,821,559 B2 * 11/2017 Tanaka ..................... B41J 29/02
9,994,013 B2 * 6/2018 Nakazawa ............... B41J 29/00
2010/0102503 A1 * 4/2010 Palumbo ................ B65H 1/266
271/145

FOREIGN PATENT DOCUMENTS

JP 2004061957 A * 2/2004
JP 2012045949 A * 3/2012
JP 2013226726 A * 11/2013
JP 2017146610 B 1/2018
WO WO-2015029405 A1 * 3/2015 ............. B41J 29/02
WO WO-2016163875 A1 * 10/2016

* cited by examiner

*Primary Examiner* — Christle I Marshall
(74) *Attorney, Agent, or Firm* — CHIP LAW GROUP

(57) ABSTRACT

A recording device is equipped with a recording unit and a scanning unit. The document table of the scanning unit is located so that the longitudinal direction of the document table is aligned with the width directions of the device. The size of the document table in the width directions of the device is larger than the size of the medium accommodation section, the center position of the document table in the width directions of the device is shifted in a first direction with respect to the center position of the medium accommodation section, and the recording unit has is a storage section that can hold article at the medium accommodation section side in the first direction and below the scanning unit.

9 Claims, 15 Drawing Sheets

RECORDING DEVICE

The present application is based on, and claims priority from JP Application Serial Number 2023-037306, filed Mar. 10, 2023, the disclosure of which is hereby incorporated by reference herein in its entirety.

BACKGROUND

1. Technical Field

This disclosure relates to a recording device with a scanning unit located above a recording unit.

2. Related Art

In JP-A-2017-146610, an image forming device with a housing of an image forming section and a housing of an image scanning section has a storage structure on the left side of the housing of the image forming section, utilizing a fact that the width dimension of the housing of the image scanning section in the left-right direction is larger than that of housing of the image forming section in the left-right direction. The storage structure is described to be able to store various articles such as instruction manuals for the image forming device, cloths for cleaning, tools for repair, and so on. Note that in the image forming device described in JP-A-2017-146610, the storage structure is provided on the left side of the housing of the image forming section, and not on the right side.

The storage structure described in JP-A-2017-146610 is configured to be using the fact that the width dimension of the housing of the image scanning section in the left-right direction is larger than width dimension of the housing of the image forming section. However, the above dimensional difference is not efficiently utilized and the storage space is small. Therefore, this storage structure is not convenient to use.

SUMMARY

In order to solve the above problems, a recording device according to this disclosure includes a recording unit having a recording section that performs recording on a medium and a scanning unit that has a document table on which a document is placed and a scanning section that scans an image of the document placed on the document table, and that is located above the recording unit; wherein the recording unit has a medium accommodation section that stores the medium before being fed and that is accessible from a first side surface, the first side surface is a front surface of the device and that left and right directions when viewing the first side surface from the front surface of the device are width directions of the device, a longitudinal direction of the document table is located along the width directions of the device, a size of the document table is larger than a size of the medium accommodation section in the width directions of the device, one direction of the width directions of the device is a first direction and the other direction is a second direction, a center position of the document table is shifted in the first direction with respect to a center position of the medium accommodation section in the width directions of the device, and the recording unit has a storage section, which is configured to store an article, in the first direction side of the medium accommodation section and below the scanning unit.

The recording device in this disclosure includes a recording unit having a recording section that performs recording on a medium and a scanning unit that has a document table on which a document is placed and a scanning section that scans an image of the document placed on the document table, and that is located above the recording unit; wherein the recording unit has a medium accommodation section that stores the medium before being fed and that is accessible from a first side surface, the first side surface is a front surface of the device and that left and right directions when viewing the first side surface from the front surface of the device are width directions of the device, a longitudinal direction of the document table is located along the width directions of the device, a size of the document table is larger than a size of the medium accommodation section in the width directions of the device, one direction of the width directions of the device is a first direction and the other direction is a second direction, a center position of the document table is shifted in the first direction with respect to a center position of the medium accommodation section in the width directions of the device, and the recording unit has a function section that performs a predetermined function in the first direction side of the medium accommodation section and below the scanning unit.

DESCRIPTION OF EMBODIMENTS

Figure 1:
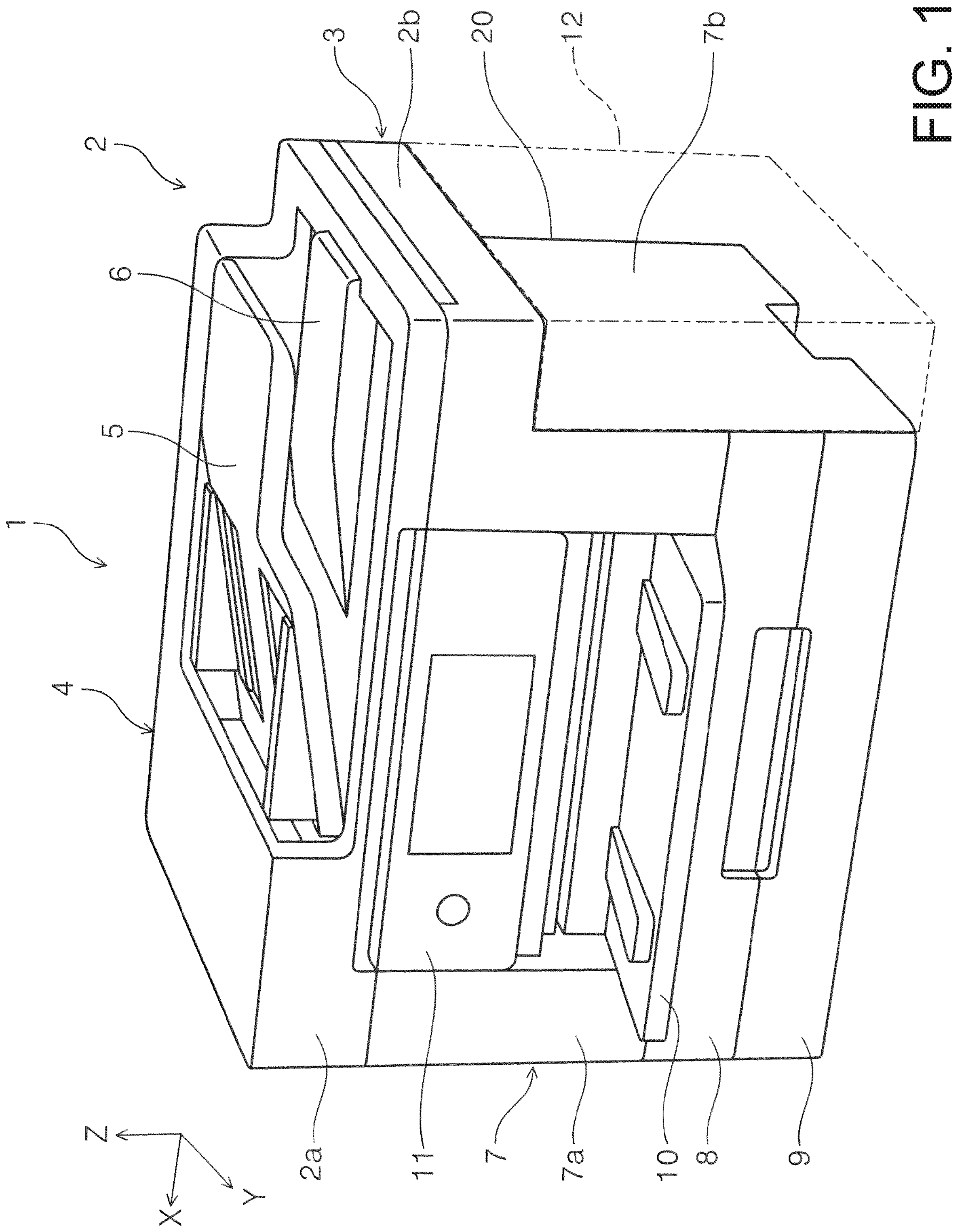
FIG. 1 is a perspective view of a printer.

The following is a brief description of this disclosure. A first aspect of the recording device includes a recording unit having a recording section that performs recording on a medium and a scanning unit that has a document table on which a document is placed and a scanning section that scans an image of the document placed on the document table, and that is located above the recording unit; wherein the recording unit has a medium accommodation section that stores the medium before being fed and that is accessible from a first side surface, the first side surface is a front surface of the device and that left and right directions when viewing the first side surface from the front surface of the device are width directions of the device, a longitudinal direction of the document table is located along the width directions of the device, a size of the document table is larger than a size of the medium accommodation section in the width directions of the device, one direction of the width directions of the device is a first direction and the other direction is a second direction, a center position of the document table is shifted in the first direction with respect to a center position of the medium accommodation section in the width directions of the device, and the recording unit has a storage section, which is configured to store an article, in the first direction side of the medium accommodation section and below the scanning unit.

According to this aspect, the center position of the document table is shifted in the first direction with respect to the center position of the medium accommodation section in the width directions of the device. Therefore, a large space area can be formed in the first direction side of the medium accommodation section and below the scanning unit. In other words, the difference in dimensions between the document table and the medium accommodation section in the width directions of the device can be efficiently utilized. Then, in this space area, the storage section is provided for storing articles. In other words, a large space area can be secured as the storage section, and the usability of the storage section can be improved.

A second aspect is an aspect according to the first aspect, wherein multiple types of storage sections with different structures can be attached to and detached from the recording unit. According to this aspect, multiple types of storage sections with different structures can be attached to and detached from the recording unit. Therefore, the user can replace the storage sections according to the user needs, and usability is improved.

A third aspect is an aspect according to the second aspect, and instead of the storage section, a function section that performs a predetermined function is configured to be detachable and attachable. According to this aspect, instead of the storage section, the function section that performs a predetermined function can be attached or detached. Therefore, it is possible to respond to user needs to use this space area for other purposes than storage of articles, and usability is improved.

A fourth aspect is an aspect according to any of the first to third aspects, and has an open and close section that opens and closes the storage section, wherein the open and close section is configured to be lockable. According to this aspect, the storage section is provided with the open and close section that opens and closes the storage section, and the open and close section is configured to be lockable. Therefore, it is possible to preserve the article stored in the storage section.

The fifth aspect is dependent on the fourth aspect, wherein the medium accommodation section is configured to be attached to and detached from the recording unit, and the open and close section is configured to engage with the medium accommodation section, and locks the medium accommodation section in an attached state when it is closed.

According to this aspect, the medium accommodation section is configured to be attached to and detached from the recording unit, and the open and close section is capable of engaging the medium accommodation section and locks the medium accommodation section in the attached state when it is closed. Therefore, in addition to the articles stored in the storage section, the medium stored in the medium accommodation section can also be preserved.

The sixth aspect is an aspect according to the fourth aspect, and has a liquid container that is configured to contain liquid to be ejected from the recording section, that is exposed on the first side surface, and that is configured to be attached to and detached from the recording unit, wherein the open and close section is configured to engage with the liquid container and, when closed, locks the liquid container in the attached state.

According to this aspect, it is provided with the liquid container, which contains liquid to be ejected from the recording section, is exposed on the first side surface, and can be attached to and detached from the recording unit. The open and close section is capable of engaging the liquid container and locks the liquid container in an attached state when closed. Therefore, in addition to the article stored in the storage section, the liquid which contained in the liquid container can also be preserved. Note that this aspect is not limited to the above fourth aspect, but may be applied to the above fifth aspect as well.

A seventh aspect of the recording device includes a recording unit having a recording section that performs recording on a medium and a scanning unit that has a document table on which a document is placed and a scanning section that scans an image of the document placed on the document table, and that is located above the recording unit; wherein the recording unit has an operation panel that is provided on the first side surface among the side surfaces that form the periphery of the recording unit, and a medium accommodation section that stores the medium before the medium is fed and that is exposed to the first side surface, the first side surface is a front surface of the device and that left and right directions when viewing the first side surface from the front surface of the device are width directions of the device, a longitudinal direction of the document table is located along the width directions of the device, a size of the document table is larger than a size of the medium accommodation section in the width directions of the device, one direction of the width directions of the device is a first direction and the other direction is a second direction, a center position of the document table is shifted in the first direction with respect to a center position of the medium accommodation section in the width directions of the device, and the recording unit has a function section that performs a predetermined function in the first direction side of the medium accommodation section and below the scanning unit.

According to this aspect, the center position of the document table is shifted in the first direction with respect to the center position of the medium accommodation section in the width directions of the device. Therefore, a large space area can be formed in the first direction side of the medium accommodation section and below the scanning unit. In other words, the difference in dimensions between the document table and the medium accommodation section in the width directions of the device can be efficiently utilized. Then, a function section that performs a predetermined function is provided in the above space area. By this, the space area for the function section can be secured and the degree of freedom in design of the function section can be improved.

An eighth aspect is an aspect according to the seventh aspect, wherein multiple types of function sections with different functions are configured to be attached to and detached from the recording unit. According to this aspect, multiple types of function sections with different functions are configured to be attached to and detached from the recording unit. Therefore, the user can replace the function section according to the user needs, and usability is improved.

The ninth aspect is an aspect according to the eighth aspect, wherein instead of the function section, a storage section that is capable of storing article can be attached to and detached from. According to this aspect, instead of the function section, a storage section that is capable of storing article attachable and detachable. Therefore, the user needs to use the space area for storing article can be satisfied, and usability is improved.

A tenth aspect is an aspect according to the first aspect, wherein in the width directions of the device, a position of the end portion of the document table in the second direction is aligned with a position of the end portion of a maximum size medium, which is capable of being stored in the medium accommodation section in the second direction.

According to this aspect, in the width directions of the device, a position of the end portion of the document table in the second direction is aligned with a position of the end portion of a maximum size medium, which is capable of being stored in the medium accommodation section in the second direction. Therefore, aforementioned space area can be secured more reliably. Note that this aspect is not limited to the first aspect above, but may be applied to any of the second to ninth aspects above.

An eleventh aspect is an aspect according to the tenth aspect, wherein a side surface of the storage section in the first direction is flush with a side surface of the scanning unit, and a side surface of the recording unit in the second direction is flush with the side surface of the scanning unit.

According to this aspect, the side surface of the storage section in the first direction is flush with the side surface of the scanning unit, and the side surface of the recording unit in the second direction is flush with the side surface of the scanning unit. Therefore, the appearance of the device is improved.

The following is a specific description of the disclosure. Note that, there are multiple embodiments of printer 1, which are examples of the recording device (to be described later), and each embodiment of printer 1 will be described hereafter with capital letter of the alphabet added to the symbol 1, for example, a printer 1A. When it is not necessary to distinguish between each embodiment of the printer, they are collectively referred to as printer 1. In each embodiment, the same symbols are used for the same configuration, and duplicate explanations are omitted.

In the X-Y-Z coordinate system shown in each figure, an X-axis indicates width directions of the device, a Y-axis indicates a depth direction of the device, and a Z-axis indicates a height direction of the device. A +Y direction is a direction from a rear surface of the device to a front surface, and a −Y direction is a direction from the front surface of the device to the rear surface. When viewed from the front side of the device, the left is a +X direction and the right is a −X direction. A +Z direction indicates an upward direction, and a −Z direction indicates a downward direction.

Figure 2:
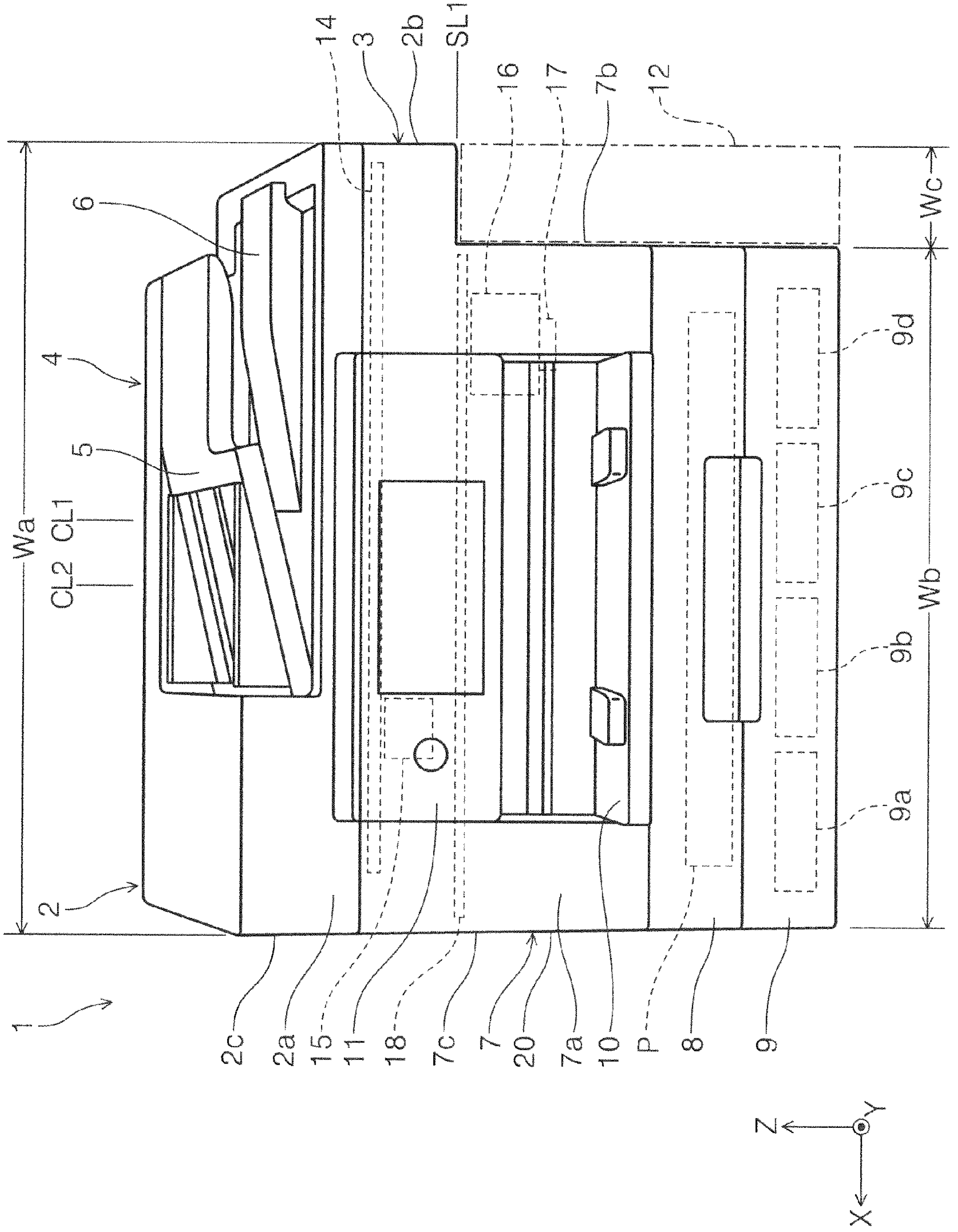
FIG. 2 is a front view of the printer.

FIGS. 1 and 2 show the basic configuration of the printer 1. Printer 1 is equipped with a printer section 7 that includes a recording head 17 that performs inkjet recording on a recording paper, which is an example of a medium, and a scanner section 2 that is provided above the printer section 7 and that scans an image of a document. The recording head 17 is an example of a recording section, and the printer section 7 is an example of a recording unit. The scanner section 2 is an example of a scanning unit. In other words, the printer 1 is a multifunction device equipped with an image scanning function in addition to the recording function.

An operation panel 11 for performing various operations is provided on the printer front surface 7*a*, which is the first side surface among the side surfaces that form a periphery of the printer section 7. The operation panel 11 is configured to be tiltable. In the retracted state, the panel surface is flush with the printer front surface 7*a*, as shown in FIGS. 1 and 2. The operation panel 11 can perform various setting operations and execution operations for recording and image scanning, and can display previews of the settings and images.

The enclosure of the printer section 7 is formed by a housing 20. An ink storage cassette 9 is located in the lowest portion of the printer section 7 and is exposed on the printer front surface 7*a*. The ink storage cassette 9 can be switched between a mounted state and a pulled-out state by being slid along the Y-axis direction. The ink storage cassette 9 in the mounted state can be pulled out from the printer section 7 by being slid toward the +Y direction. The ink storage cassette 9 can be mounted in the printer section 7 by being slid in the −Y direction.

The ink storage cassette 9 has four ink accommodation sections 9*a*, 9*b*, 9*c*, and 9*d*, which can be attached to and detached from the ink storage cassette 9 to accommodate four colors of ink, black, cyan, magenta, and yellow, as an example. The ink accommodation sections 9*a*, 9*b*, 9*c*, 9*d* and the recording head 17 are connected by an ink tube (not shown), and ink is supplied from the ink accommodation sections 9*a*, 9*b*, 9*c*, 9*d* to the recording head 17 through this ink tube.

A paper cassette 8, which can be attached to and detached from the printer section 7, is provided above the ink storage cassette 9. The paper cassette 8 is an example of a medium accommodation section where the recording paper before feeding is stored and that is exposed on the printer front surface 7*a*. However, the medium accommodation section is not limited to the paper cassette 8, which is removable from the printer section 7, but may be fixed to the printer section 7. There may be more than one paper cassette 8.

Symbol P indicates a stack of recording paper stored in the paper cassette 8. As an example, the recording paper shown in FIG. 2 is A4 size paper and is stored with the short side of the paper along the X axis direction. The paper cassette 8 in the mounted state can be pulled out from the printer section 7 by being slid toward the +Y direction. The paper cassette 8 can be mounted in the printer section 7 by being slid in the −Y direction. The recording paper stored in the paper cassette 8 is fed in the −Y direction by a feeding means (not shown), then is inverted in the +Y direction and is fed to the position facing the recording head 17.

The recording head 17 is an inkjet recording head that ejects ink as a liquid and is provided on a carriage 16. The recording head 17 performs recording by ejecting ink onto the recording paper. The carriage 16 reciprocates in the X-axis direction under drive power of a motor (not shown). The recording paper, which has been recorded by the recording head 17, is discharged in the +Y direction by a discharge means (not shown) and is supported by a paper discharge tray 10. The paper discharge tray 10 is connected to the printer section 7 via a hinge (not shown), and opens and closes by pivoting. FIGS. 1 and 2 show the paper discharge tray 10 in an open state. Although not shown in the figure, the paper discharge tray 10, when closed, together with the operation panel 11, constitutes the front surface of the device.

Next, the scanner section 2 is equipped with a document feed section 4 above the scanner main body 3. The document feed section 4 is unitized and pivotably connected to the scanner main body 3 via a hinge (not shown). This hinge (not shown) has a rotation center along the Y-axis direction and is located at an end portion in the +X direction. The document feed section 4 pivots on the above hinge with respect to the scanner main body 3 to switch between a state in which it covers the document table 14 and a state in which it opens the document table 14. The document feed section 4 has a document transport means (not shown), which feeds the document placed on the document feed tray 5 and discharges the scanned document to the document discharge tray 6. Note that instead of the document feed section 4, a cover that can be switched between a state that covers the document table 14 and a state that does not cover the document table 14 can also be used. In other words, the scanner section 2 does not have to be equipped with an automatic document feed function.

The document table 14 is composed of a glass plate parallel to the X-Y plane. Below the document table 14, there is a scanning sensor 15, which is an example of a scanning section that scans an image of a document placed on the document table 14. The scanning sensor 15 is a contact image sensor (CIS) extended in the Y-axis direction, and scans an image of the document placed on the document table 14 while moving in the X-axis direction under drive power of a motor (not shown). In the case of document scanning using the document feed section 4, the scanning sensor 15 stops below the document table 14 near an end portion of the document table 14 in the +X direction. In this state, the scanning sensor 15 scans the image of the document as the document is transported over the scanning sensor 15.

Here, symbol WA in FIG. 2 indicates a size in the X-axis direction of the scanner main body 3, which constitutes the scanner section 2. Note that in this embodiment, the scanner main body 3 and the document feed section 4 have the same size in the X-axis direction, but the size of the document feed section 4 may be smaller than the size of the scanner main body 3 in the X-axis direction. The size of the scanner main body 3, Wa, depends on the document table 14. The document table 14 is designed so that its longitudinal direction is along the X-axis direction and its short side direction is along the Y-axis direction. Therefore, the size Wa of the scanner main body 3 depends on the size of the longitudinal direction of the document table 14. For example, a size of the document table 14 in the longitudinal direction is a size of the longitudinal direction of an A4 size paper added to a dimension of a scanning region, which is used to scan the document when using the document feed section 4. Of course, the size of the document table 14 in the X-axis direction is not limited to the above.

In FIG. 2, symbol Wb indicates a size of the printer section 7 in the x-axis direction. The size Wb of the printer section 7 depends on the paper cassette 8. The size Wb of the printer section 7 depends on the X-axis dimension of the maximum size of recording paper that can be stored in the paper cassette 8. The paper cassette 8 is configured so that, for example, A4 size paper is the maximum size paper, and the longitudinal direction of the A4 size paper is along the Y-axis direction and the short side direction thereof is along the X-axis direction. Of course, the size of the paper cassette 8 is not limited to the above.

The size Wa of the scanner main body 3 and the size Wb of the printer section 7 are determined as described above. Therefore, the size Wa of the scanner main body 3 is larger than the size Wb of the printer section 7. By this, a space section 12 is formed in the −X direction side of the printer section 7 and below the scanner main body 3. In FIG. 2, symbol Wc indicates the size of the space section 12 in the X-axis direction.

In FIG. 2, symbol CL1 indicates a center position of the document table 14 in the X-axis direction, and symbol CL2 indicates a center position of the paper cassette 8 in the X-axis direction. In this embodiment, the center position CL2 coincides with a center position in the X-axis direction of the recording paper stored in the paper cassette 8. As shown in the figure, the center position CL1 of the document table 14 is shifted in the −X direction, which is the first direction, with respect to the center position CL2 of the paper cassette 8. By this, the space section 12 is formed in the −X direction side of the printer section 7 and below the scanner main body 3. However, not limited to this, the center position CL1 of the document table 14 may be shifted in the +X direction, which is the second direction, with respect to the center position CL2 of the paper cassette 8. Then, the space section 12 may be formed in the +X direction side of the printer section 7.

Note that the housing 20 that forms the enclosure of the printer section 7 in this embodiment also constitutes the enclosure of the scanner main body 3. In other words, the housing that forms the enclosure of the printer section 7 and the housing that forms the enclosure of the scanner main body 3 are one and the same in this embodiment. In FIG. 2, symbol 18 is a partition wall that separates the scanner main body 3 from the printer section 7, and symbol SL1 is a height position of the partition wall 18 in the Z-axis direction. A portion of the housing 20 above the height position SL1 comprises the scanner main body 3, and a portion of the housing 20 below the height position SL1 comprises the printer section 7. In other words, the scanner section 2 is above the height position SL1 and the printer section 7 is below the height position SL1. Note that the height position SL1 can be set at an appropriate position between a top surface of the carriage 16 and a bottom surface of the scanning sensor 15. For example, the height position SL1 may be an intermediate position between the top surface of the carriage 16 and the bottom surface of the scanning sensor 15.

However, the housing that forms the enclosure of the printer section 7 and the housing that forms the enclosure of the scanner main body 3 may be separate members. In such a case, the scanner main body 3 may be connected to the printer section 7 via hinge or the like, and may be able to open and close with respect to the printer section 7. In this way, since the scanner main body 3 can be opened and closed with respect to the printer section 7, the inside of the printer section 7 can be exposed when the scanner main body 3 is opened. By this, for example, paper jams can be easily removed and maintenance of the recording head 17 can be easily performed.

Note that symbol **7*b* is a side surface of the printer section 7 in the −X direction, and symbol 2*b* is a side surface of the scanner section 2 in the −X direction. The side surface 2*b* is located further in the −X direction than is the side surface 7*b*. Symbol 7*c* is a side surface of the printer section 7 in the +X direction, and symbol 2*c* is a side surface of the scanner section 2 in the +X direction. In this embodiment, the side surface 2*c* and the side surface 7*c* are flush. However, this is not limited to this, and the side surface 2*c* may be located further in the +X direction than is the side surface 7$c$, or the side surface 2$c$ may be located further in the −X direction than is the side surface 7**$c$.

The symbol 2$a$ is the side surface in the +Y direction of the document feed section 4 that constitutes the scanner section 2, that is, the front surface of the document feed section 4, and in this embodiment, the front surface 2$a$ of the document feed section 4 and the printer front surface 7$a$ are flush to each other. However, the front surface 2$a$ of the feed section may be shifted in the +Y or −Y direction with respect to the printer front surface 7$a$. In this embodiment, the side surface of the scanner main body 3 in the +Y direction is flush with the printer front surface 7$a$, but the side surface of the scanner main body 3 in the +Y direction may be shifted in either the +Y or −Y direction with respect to the printer front surface 7$a$. Note that the front surface 2$a$ of the feeding section, the side surface of the scanner main body 3 in the +Y direction, the printer front surface 7$a$, a side surface of the paper cassette 8 in the +Y direction, and a side surface of the ink storage cassette 9 in the +Y direction are flush with each other in this embodiment.

First Aspect of Use of the Space Section

Figure 3:
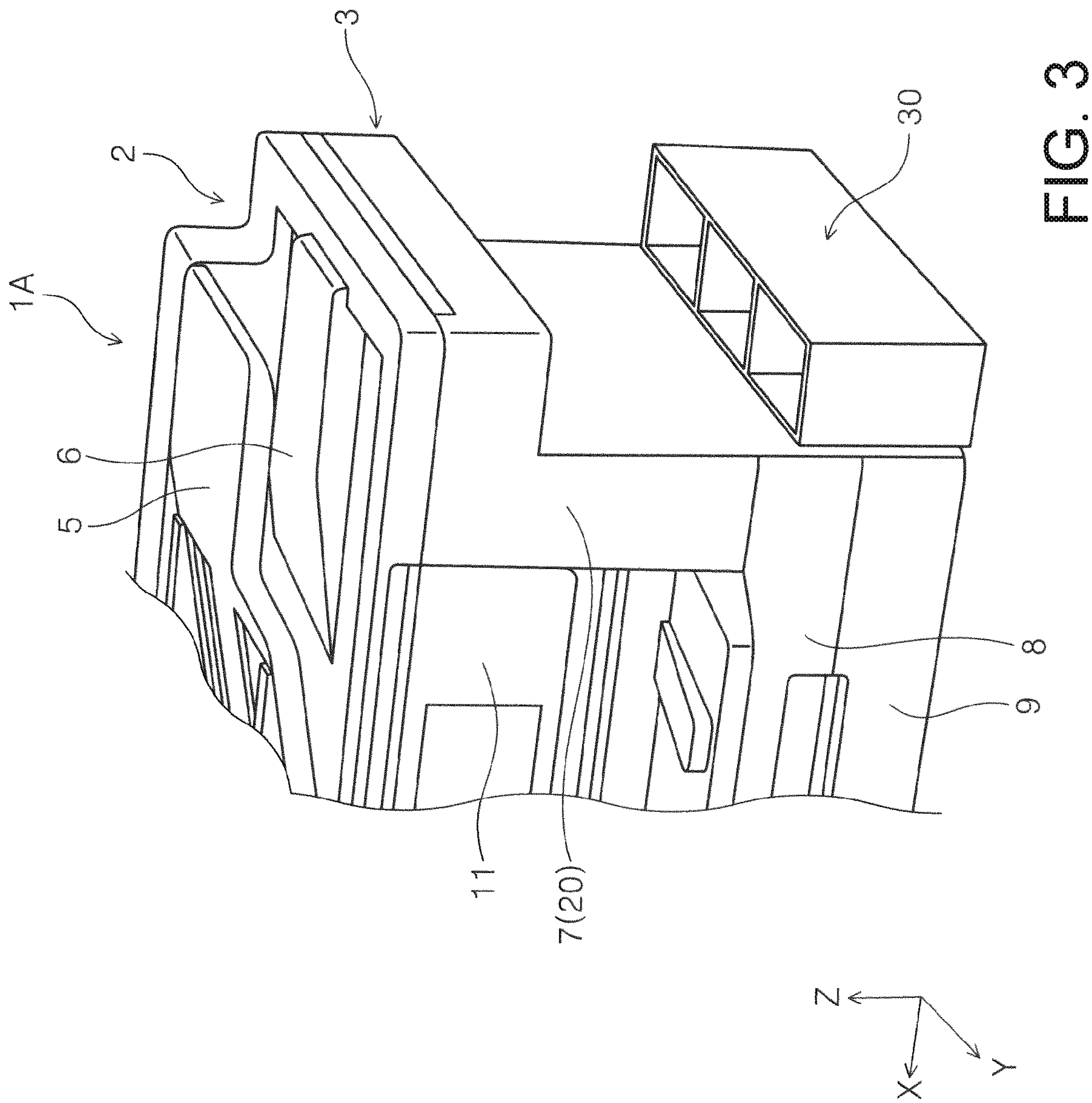
FIG. 3 is a diagram showing a first aspect of use of a space section.

FIG. 3 shows a first aspect of use of the space section 12. The space section 12 of a printer 1A can be provided with a first storage section 30 as a storage section that can hold an article. The first storage section 30 is configured as a pen stand, for example. The first storage section 30 may be fixed to the printer section 7, or it may be removable. When the first storage section 30 is provided to be attached to and detached from the printer section 7, other storage sections or function sections described herein may be configured to be attached instead of the first storage section 30.

Second Aspect of Use of the Space Section

Figure 4:
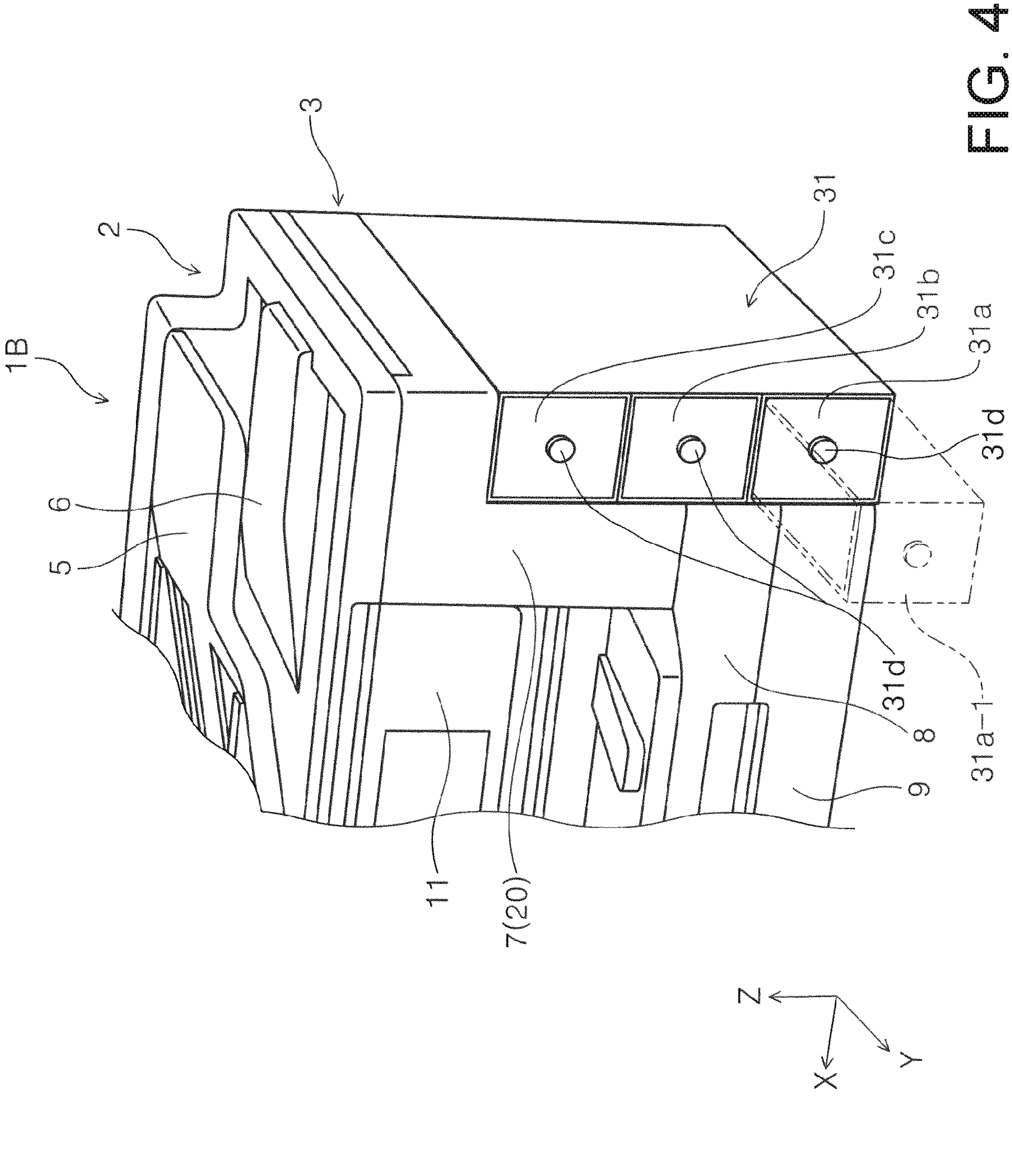
FIG. 4 is a diagram showing a second aspect of the use of the space section.

FIG. 4 shows a second aspect of use of the space section 12. The space section 12 of a printer 1B can be provided with a second storage section 31 as a storage section that can hold article. The second storage section 31 is configured as a small container, as an example, and has drawer sections 31$a$, 31$b$, and 31$c$. Double-dotted line and symbol 31$a$-1 show a state in which the drawer section 31$a$ is pulled out as an example. Symbol 31$d$ indicates a finger-hook for hooking a finger. In this embodiment, the three drawer sections 31$a$, 31$b$, and 31$c$ are provided, but it is possible to have only one drawer section, or two drawer sections, or four or more drawer sections. If the second storage section 31 is provided to be attached to and detached from the printer section 7, it may be configured so that other storage sections or function sections described herein can be attached instead of the second storage section 31.

Third Aspect of Use of the Space Section

Figure 5A:
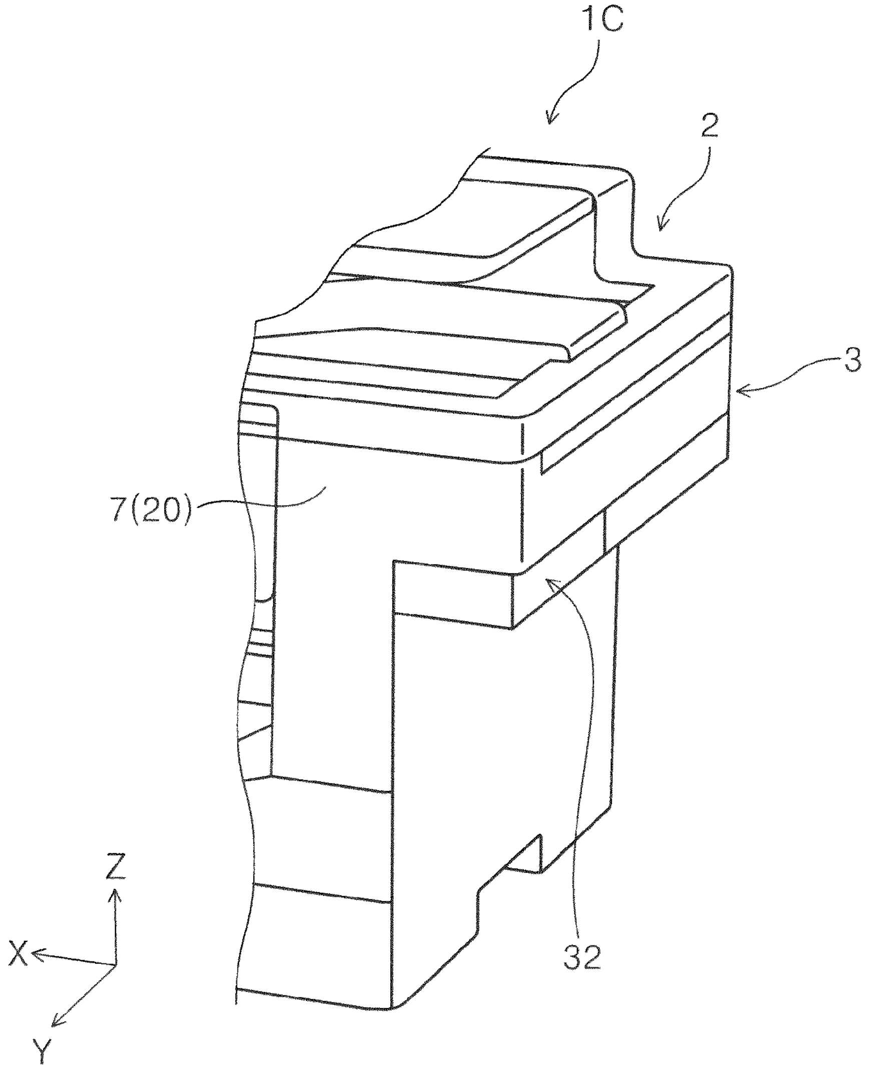
FIG. 5A is a diagram showing a third aspect of the use of the space section.
Figure 5B:
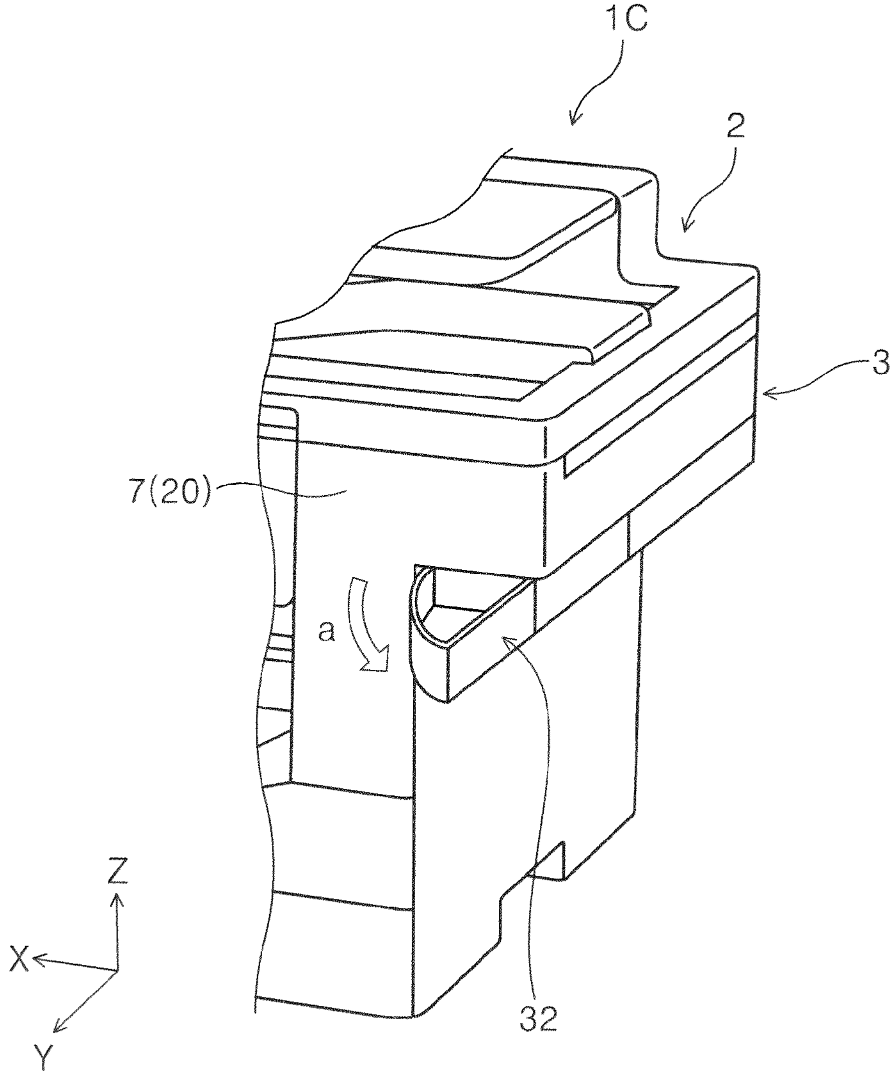
FIG. 5B is another diagram showing the third aspect of the use of the space section.

FIG. 5 shows a third aspect of use of the space section 12. The space section 12 of a printer 1C can be provided with a third storage section 32 as a storage section that can hold an article. The third storage section 32 is configured as a small container, for example. The third storage section 32 is pivotable with respect to the printer section 7 via a hinge (not shown), and can be pivoted to switch between the stowed state shown in FIG. 5A and the pulled out forward (arrow a direction) state shown in FIG. 5B. The third storage section 32 can hold clips, and the like, as an example. Note that in this embodiment, the third storage section 32 is located at the front side of the device, and a space behind the third storage section 32 of the device and a space below the third storage section 32 are not utilized, but these spaces may be used for other purposes. For example, the space section below the third storage section 32 can be configured to be used to attach other storage sections or function sections as described herein. The third storage section 32 may also have a protrusion or recess to catch with a finger.

Fourth Aspect of Use of the Space Section

Figure 6:
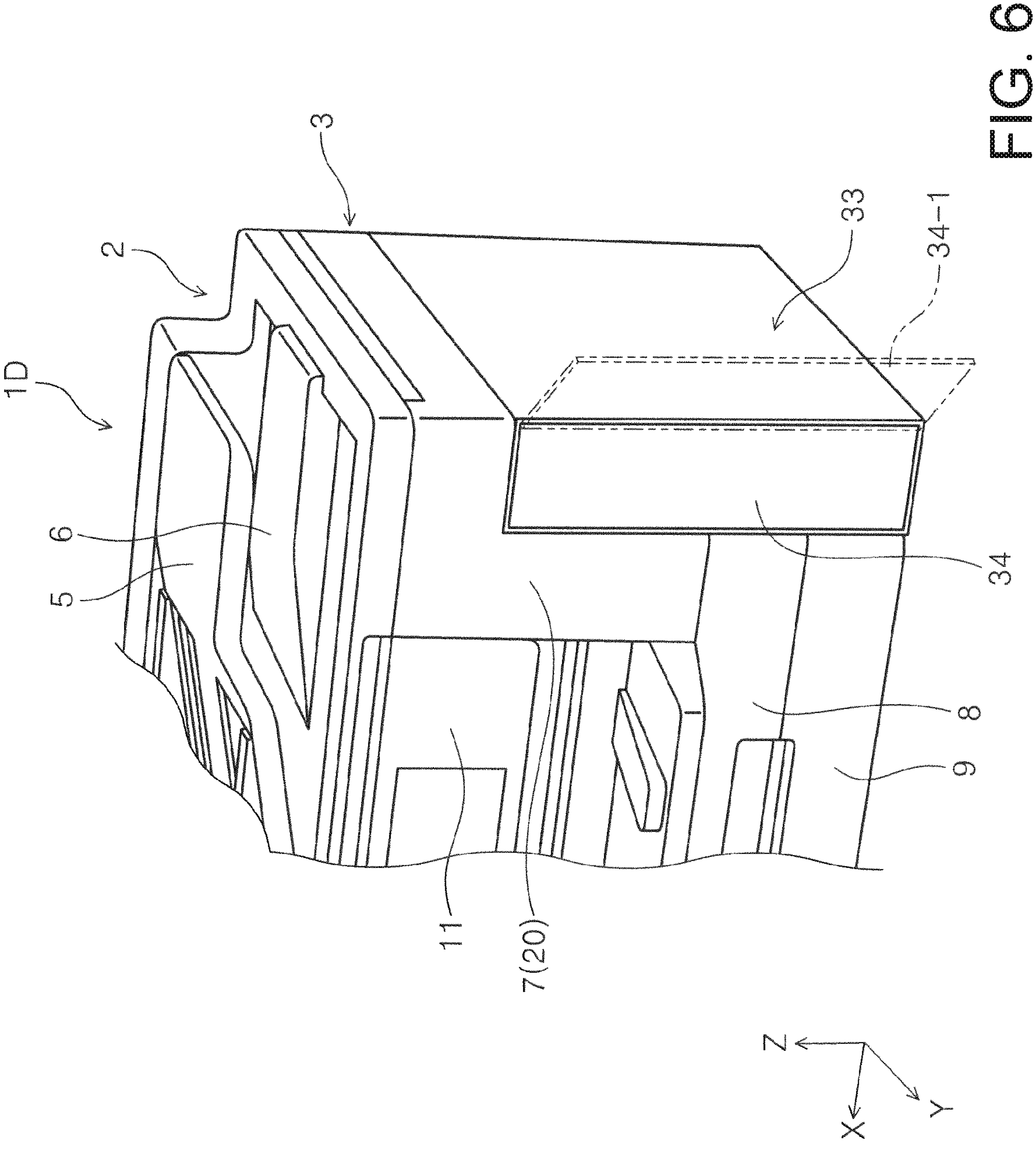
FIG. 6 is a diagram showing a fourth aspect of the use of the space section.

FIG. 6 shows a fourth aspect of use of the space section 12. The space section 12 of a printer 1D can be provided with a fourth storage section 33 as a storage section that can hold an article. The fourth storage section 33 has an open and close section 34 in the +Y direction, that is, at the front surface of the device. The open and close section 34 can pivot on the printer section 7 via a hinge (not shown), and by pivoting, the open and close section 34 can switch between the closed state shown by the solid line and the open state shown by the double-dotted line and sign 34-1, where the open and close section 34 opens to the front right side. By opening the open and close section 34, the inside of the storage section can be accessed. A protrusion or recess may be formed in the open and close section 34 to catch with a finger. Further, a magnet or other holding means may also be provided to hold the open and close section 34 in the closed state. A push latch mechanism or the like may also be provided to push the open and close section 34 into a closed state by pushing it in, and to open it by pushing it in again. The fourth storage section 33 can hold relatively large articles. As an example, it can hold consumable articles such as instruction manuals and ink. The fourth storage section 33 may be fixed to the printer section 7, or it may be removable. When the fourth storage section 33 is provided to be attached to and detached from the printer section 7, it may be configured so that other storage sections or function sections described herein can be attached instead of the fourth storage section 33.

Figure 7:
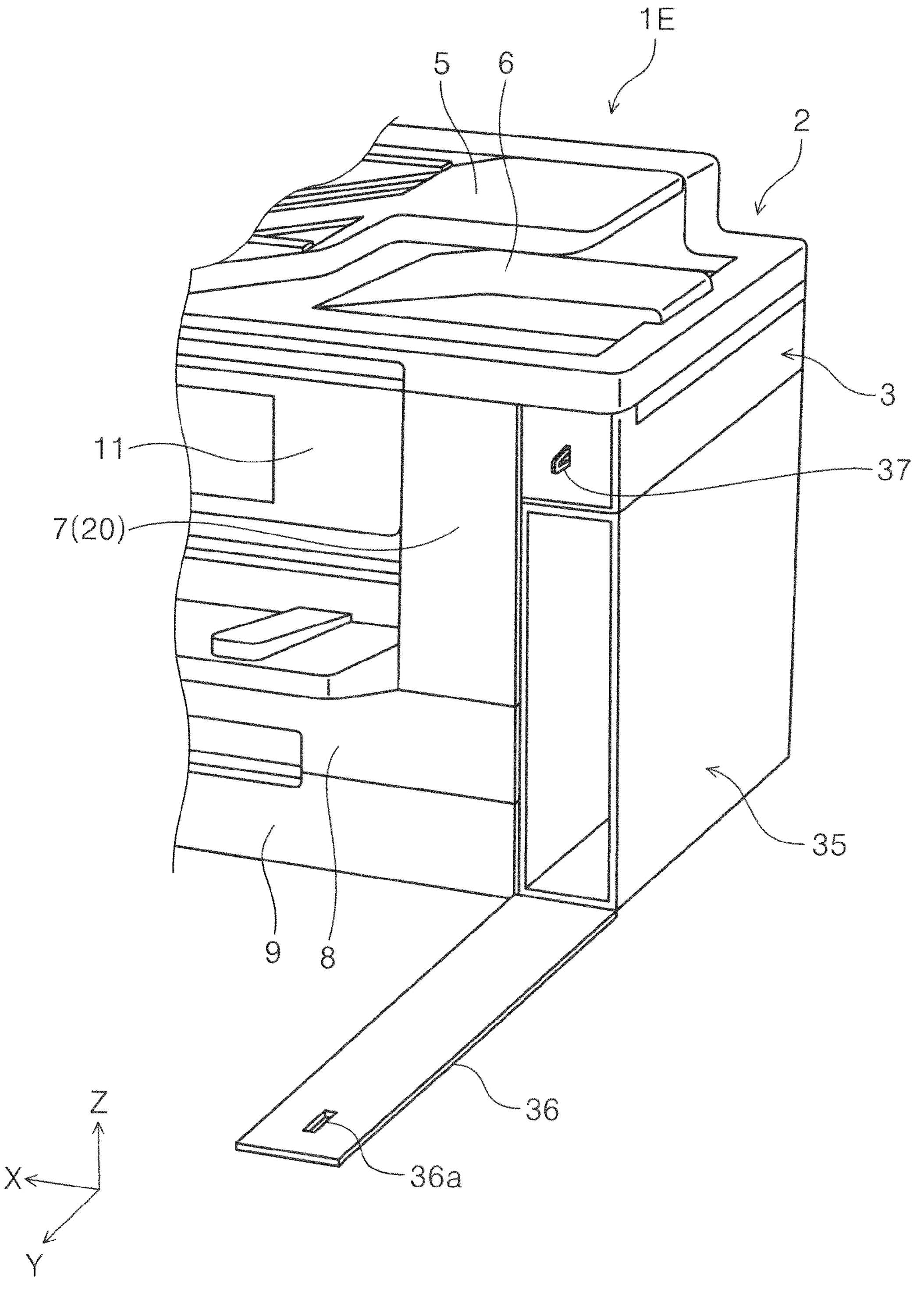
FIG. 7 is a diagram showing a modification of the fourth aspect of the use of the space section.

FIGS. 7 and 8 show a fifth storage section 35, which is a modification of the fourth storage section 33. A printer 1E with the fifth storage section 35 has an open and close section 36. The open and close section 36 can open forward as shown in FIG. 7 via a hinge (not shown). Note that a protrusion or recess may be formed in the open and close section 36 to catch with a finger. Further, a magnet or other holding means may also be provided to hold the open and close section 36 in the closed state. A push latch mechanism or the like may also be provided to push the open and close section 36 into a closed state by pushing it in, and to open it by pushing it in again. The upper part of the open and close section 36 covers part of the scanner main body 3, and there is a protrusion 37 on the front surface of the scanner main body 3. The open and close section 36 has an opening 36$a$ so that the protrusion 37 can be exposed through the opening 36$a$ to the front surface of the device when the open and close section 36 is closed.

Figure 8A:
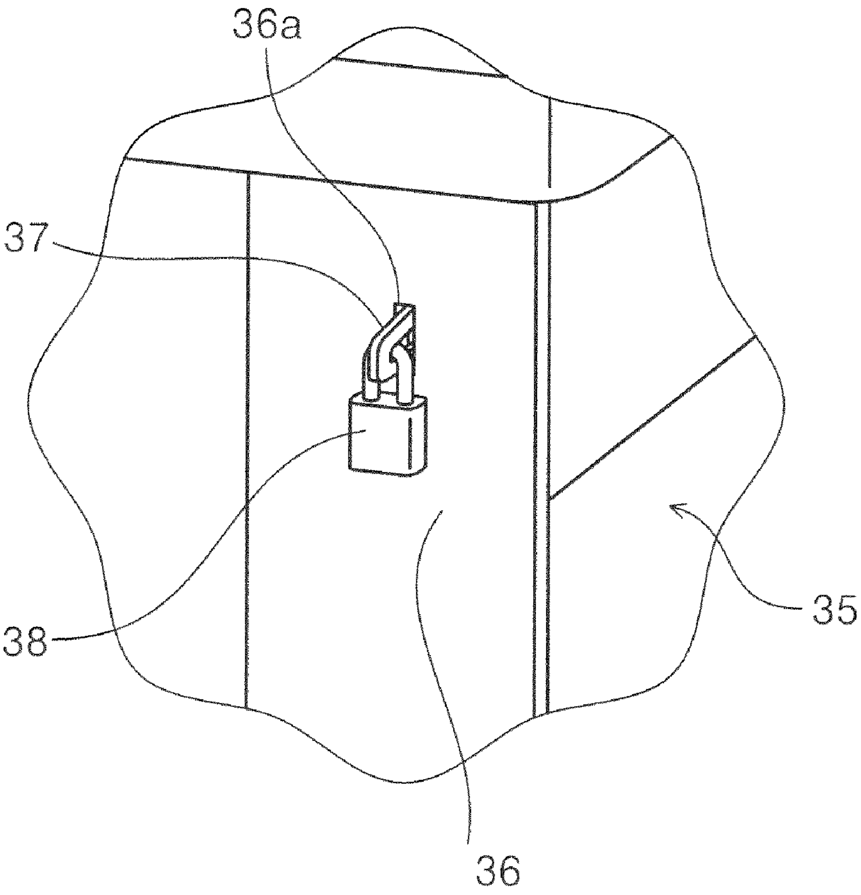
FIG. 8A is another diagram showing the modification of the fourth aspect of the use of the space section.
Figure 8B:
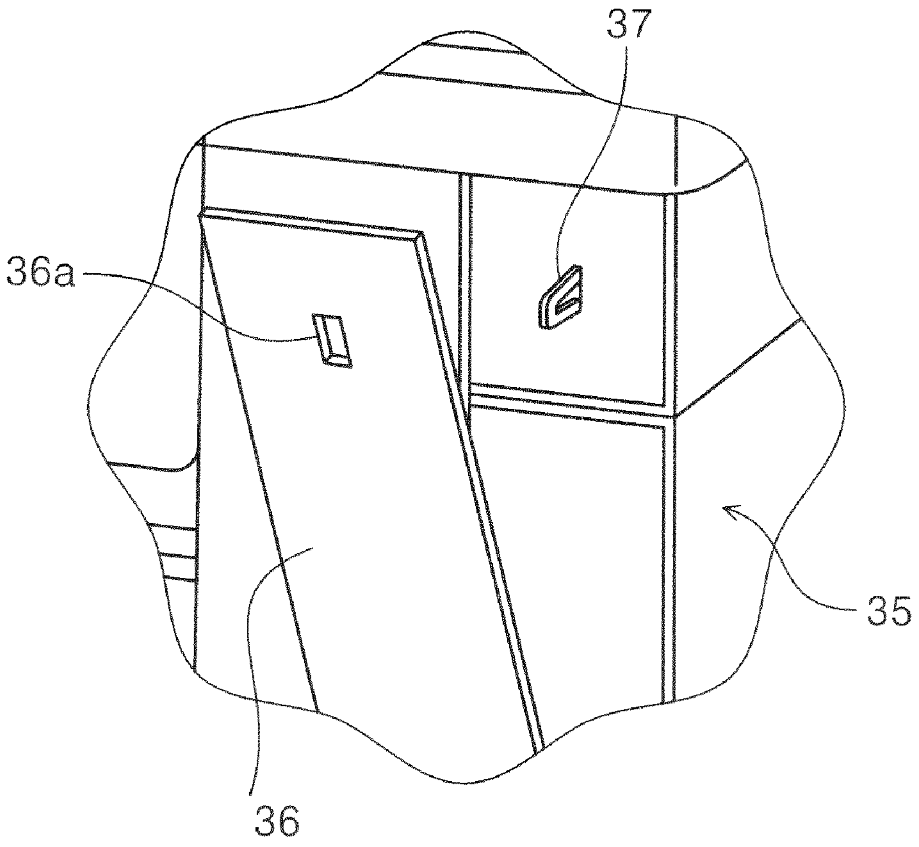
FIG. 8B another diagram showing is still the modification of the fourth aspect of the use of the space section.

As shown in FIG. 8A, the protrusion 37 has a shape in which a padlock 38 can be hung, and by this, the open and close section 36 can be locked when it is in the closed state. As a result, the article stored in the fifth storage section 35 can be preserved. The padlock 38 can then be removed to unlock and open the open and close section 36, as shown in FIG. 8B.

The open and close section 34 in FIG. 6 or the open and close section 36 in FIG. 7 may be configured as the operation panel 11 shown in FIGS. 1 and 2. According to this configuration, an area above the paper discharge tray 10 shown in FIGS. 1 and 2 can be used, for example, as a storage area for the paper discharge tray 10, so the capacity of the paper discharge tray 10 can be increased.

As described above, in the printer section 7, the center position CL1 of the document table 14 is shifted in the −X direction with respect to the center position CL2 of the paper cassette 8. Therefore, a large space that is the space section 12 can be formed in the −X direction side of the paper cassette 8 and below the scanner section 2. In other words, the difference in dimensions between the document table 14 and the paper cassette 8 in the width directions of the device can be efficiently utilized. Since the space section 12 is provided with storage sections (30, 31, 32, 33, 35) that can hold an article, the size of the storage section can be secured and the usability of the storage section can be improved.

Further, in the configuration where multiple types of storage sections (30, 31, 33, 35) with different structures can be attached to and detached from the printer section 7, the storage sections can be replaced according to user needs, and usability is improved.

In addition, in the configuration where a function section that performs a predetermined function (to be described later) is attachable and detachable instead of the above storage section, it is possible to respond to user needs to use the space section 12 for purposes other than storage of article, and usability is improved.

Further, in printer 1E (FIG. 7), the storage section 35 has the open and close section 36 that opens and closes the storage section 35, and the open and close section 36 is lockable to protect the article stored in the storage section 35.

Figure 9:
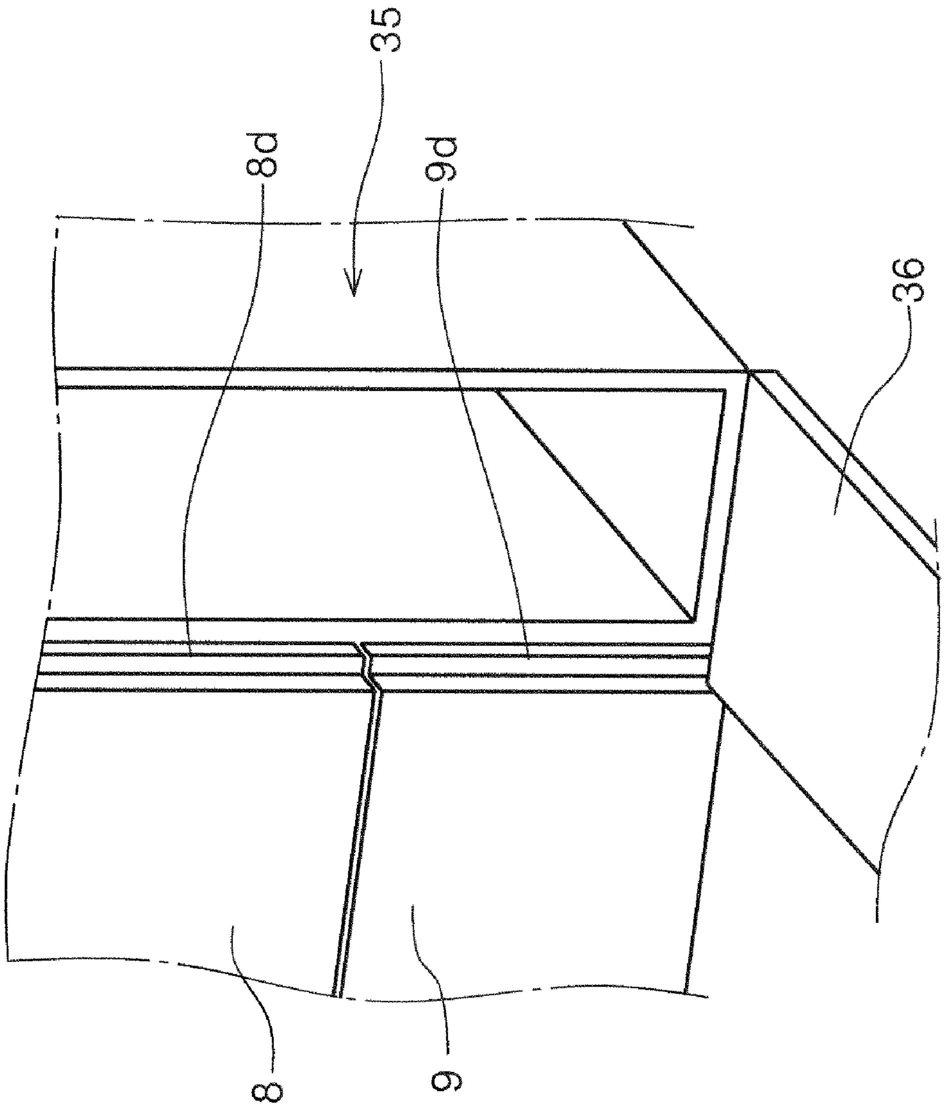
FIG. 9 is a diagram showing still another modification of the fourth aspect of the use of the space section.

FIG. 9 is another embodiment of printer 1E (FIG. 7), where symbol 8*d* shows a locked portion formed in the paper cassette 8. The locked portion 8*d* is covered by the open and close section 36 when the open and close section 36 is closed. Therefore, when the open and close section 36 is closed, the paper cassette 8 is locked in the mounted state. In this way, in a configuration where the paper cassette 8 can be attached to and detached from the printer section 7, the open and close section 36 can engage with the paper cassette 8 and can lock the paper cassette 8 in the attached state in the closed state. According to such a configuration, in addition to the article stored in storage section 35, the paper stored in paper cassette 8 can also be preserved.

Symbol 9*d* in FIG. 9 shows the locked portion which is formed in the ink storage cassette 9. The locked portion 9*d* is covered by the open and close section 36 when the open and close section 36 is closed. Therefore, when the open and close section 36 is closed, the ink storage cassette 9 is locked in the mounted state. In this configuration where the ink storage cassette 9 can be attached to and detached from the printer section 7, the open and close section 36 can engage with the ink storage cassette 9 and, when closed, can lock the ink storage cassette 9 in the mounted state. According to such a configuration, in addition to the article stored in the storage section 35, the ink stored in the ink storage cassette 9 can also be preserved.

Figure 10:
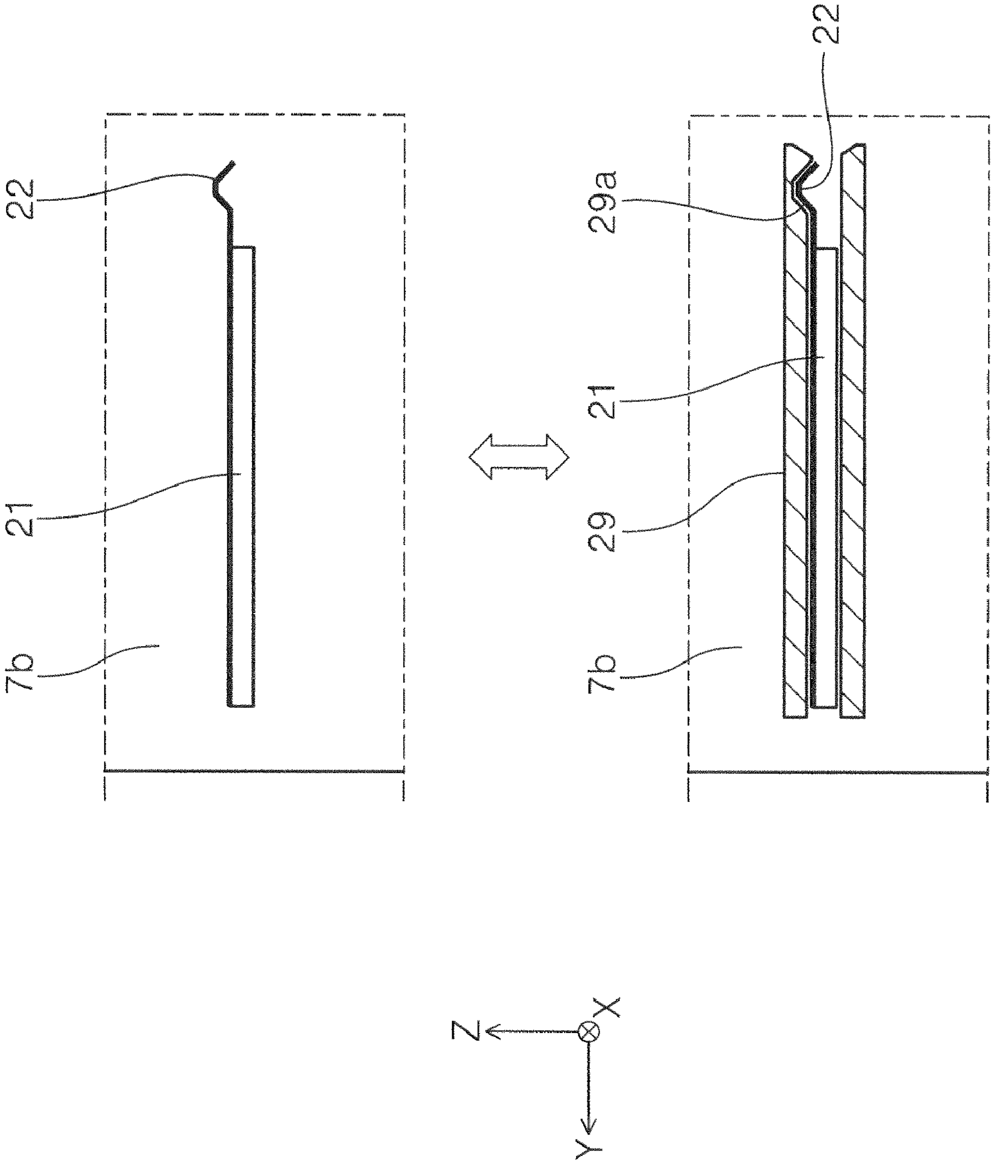
FIG. 10 is a diagram showing a attaching structure of a storage section.

Note that each storage section and each function section described below can be attached to and detached from the printer section 7 using the attachment structure shown in FIG. 10, as an example. On the side surface 7*b* in the −X direction of the printer section 7, a guide section 21 extends along the Y-axis direction, and a plate spring 22 is provided at the end portion of the guide section 21 in the −Y direction. The plate spring 22 can displace the convex portion of the spring in the Z-axis direction by bending. Each storage section and each function section described below has a guided section 29 extending along the Y-axis direction. The guided section 29 is configured to receive the guide section 21, and a concave section 29*a* is formed at the end portion of the guided section 29 in the −Y direction so that the concave section 29*a* can receive the convex portion of the plate spring 22.

When attaching each storage section or each function section described below to the printer section 7 along the −Y direction, the plate spring 22 can bend downward inside the guided section 29. By this, each storage section or each function section (to be described later) can be slid toward the −Y direction. When each storage section or each function section (to be described later) is slid toward the −Y direction, the convex portion of the plate spring 22 enters the concave portion 29*a* of the guided section 29. By this, each storage section or each function section (to be described later) can be hold in the attached state. Also, when each storage section or each function section (to be described later) in the attached state is slid in the +Y direction, the plate spring 22 can be bent downward, and each storage section or each function section (to be described later) can be removed in the +Y direction.

Fifth Aspect of Use of the Space Section

Figure 11:
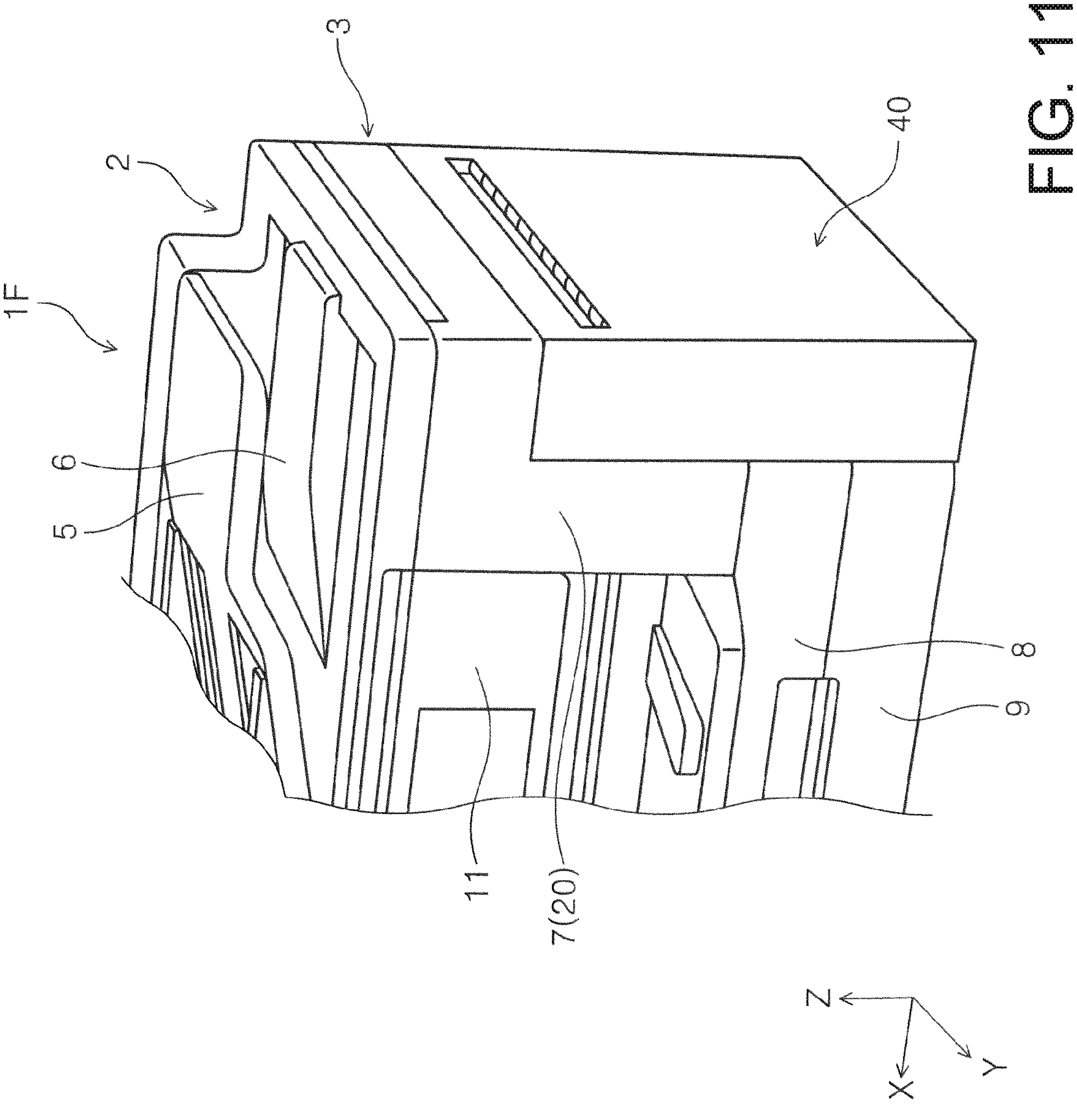
FIG. 11 is a diagram showing a fifth aspect of the use of the space section.

FIG. 11 shows a fifth aspect of use of the space section 12. The space section 12 of a printer 1F can be provided with a first function section 40 as a function section that performs a predetermined function. The first function section 40 is configured as a shredder. The shredder can have a handle for manual rotation, for example, or it can be driven by a motor. When the first function section 40 is driven by a motor, a connection cable (not shown) is connected to the printer section 7. The first function section 40 may be fixed to the printer section 7, or it may be removable. When the first function section 40 is provided to be attached to and detached from the printer section 7, other storage sections and function sections described herein may be configured to be attached instead of the first function section 40.

Sixth Aspect of Use of the Space Section

Figure 12:
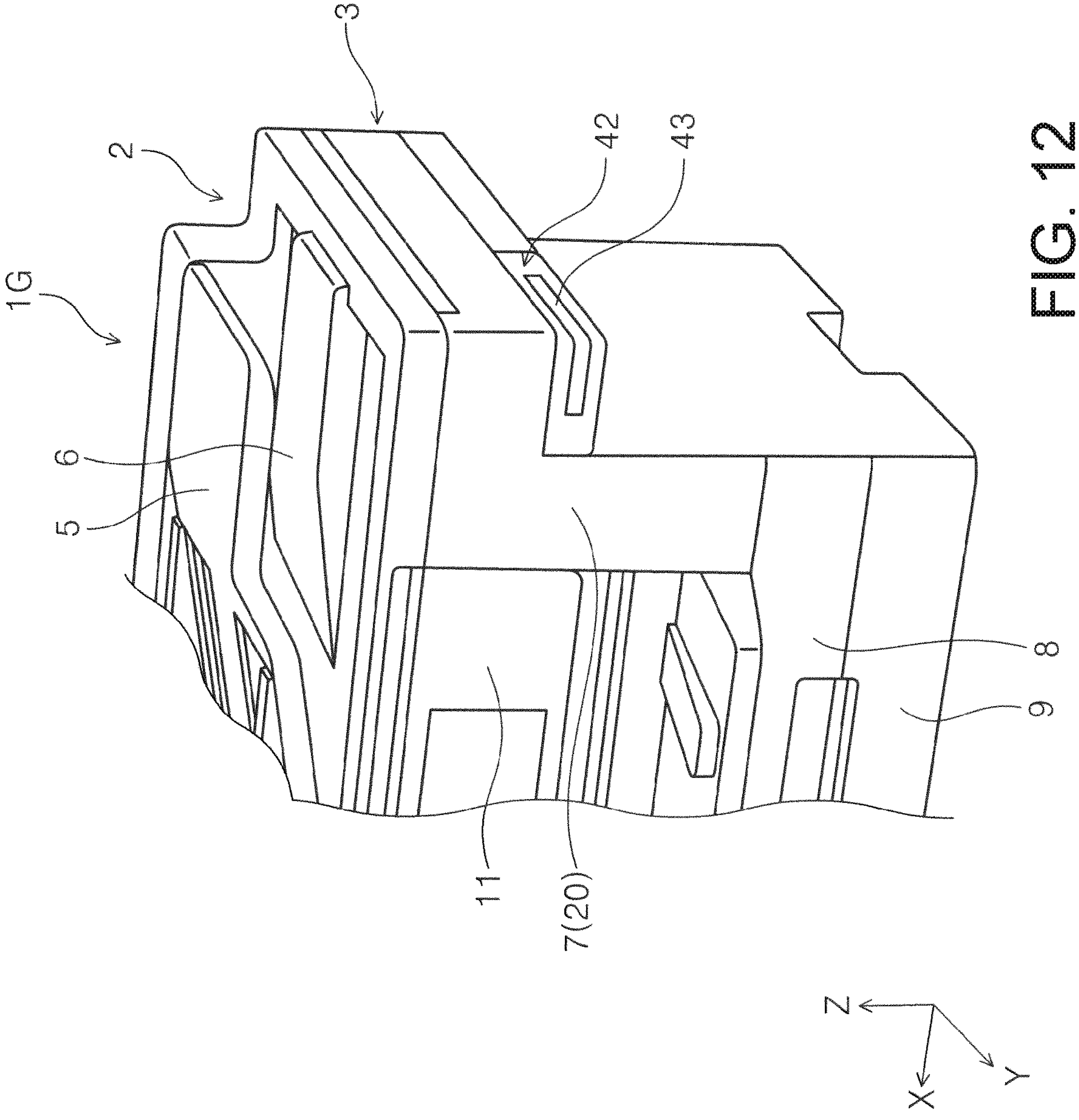
FIG. 12 is a diagram showing a sixth aspect of the use of the space section.

FIG. 12 shows a sixth aspect of use of the space section 12. The space section 12 of a printer 1G can be provided with a second function section 42 as a function section that performs a predetermined function. The second function section 42 is configured as a stapler. The second function section 42 has an opening 43, with the stapler (not shown) inside the opening 43. By inserting the corners of multiple sheets of recording paper into the opening 43, the multiple sheets of recording paper can be bound with a staple. The second function section 42 may be fixed to the printer section 7, or it may be removable. Although the space area below the second function section 42 is not utilized in this aspect, this space area may be used for other purposes. For example, the space area below the second function section 42 can be configured to be used to attach other storage sections or function sections as described herein.

Seventh Aspect of Use of the Space Section

Figure 13:
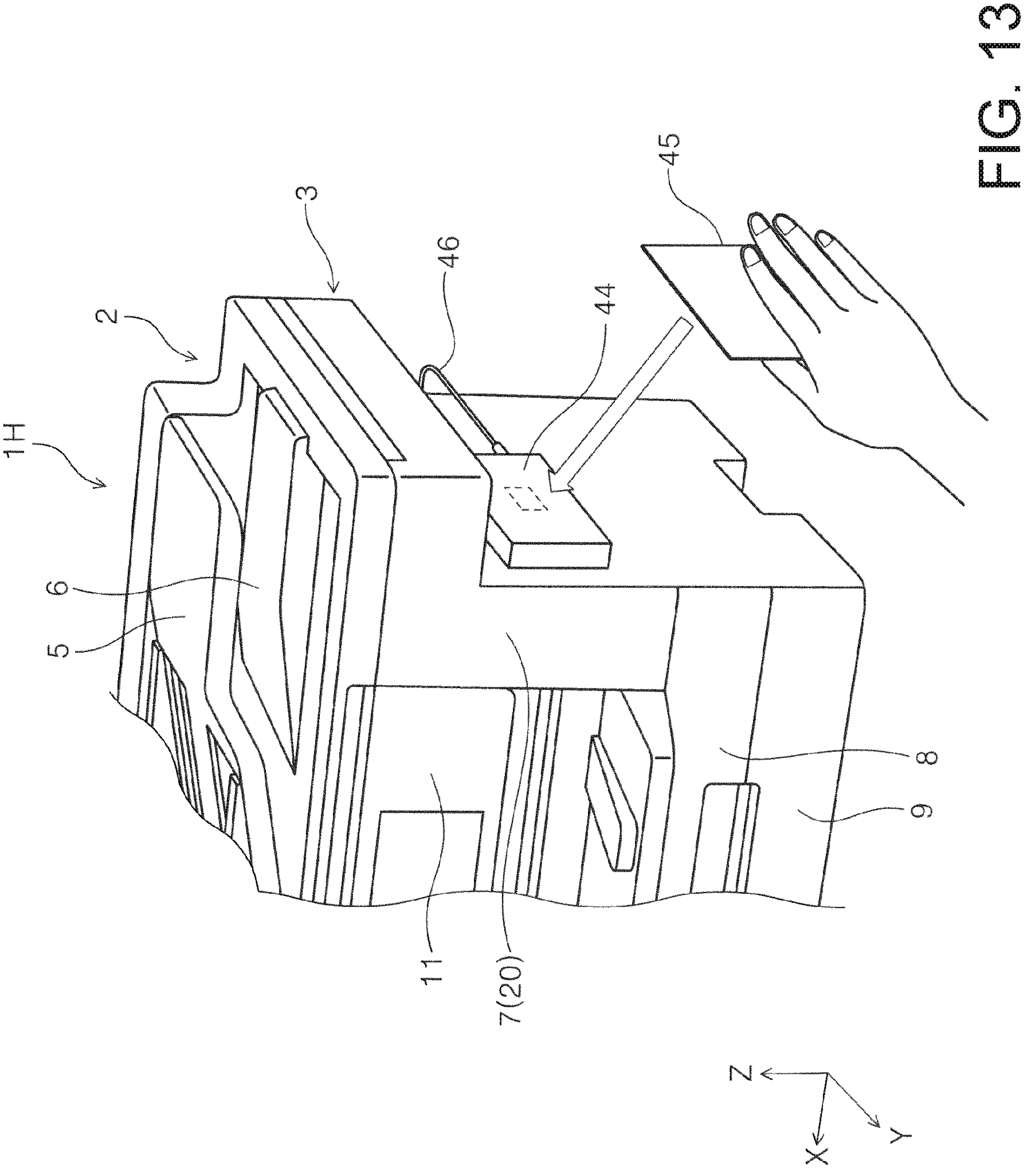
FIG. 13 is a diagram showing a seventh aspect of the use of the space section.

FIG. 13 shows a seventh aspect of use of the space section 12. The space section 12 of a printer 1H can be provided with a third function section 44 as a function section that performs a predetermined function. The third function section 44 is configured as a near field communication (NFC)

section. The third function section 44 is connected to the printer section through a connection cable 46. The NFC function of the third function section 44 can read the stored information in a contactless IC card 45, which can be used for user authentification, for example. The third function section 44 may be fixed to the printer section 7, or it may be removable.

As described above, in the printer section 7, the center position CL1 of the document table 14 is shifted in the −X direction with respect to the center position CL2 of the paper cassette 8. Therefore, a large space that is the space section 12 can be formed in the −X direction side of the paper cassette 8 and below the scanner section 2. In other words, the difference in dimensions between the document table 14 and the paper cassette 8 in the width directions of the device can be efficiently utilized. Then, the space section 12 is provided with the function sections (40, 42, 44) that perform a predetermined function. That is, the space area for placing the function sections can be secured, and the degree of freedom in designing the function sections can be improved. Note that each function of the function sections (40, 42, 44) described above is an example, and it is of course possible that other function sections may be used to perform other functions.

In a configuration where multiple function sections with different functions can be attached to and detached from the printer section 7, the function section can be replaced according to the user needs, and usability is improved.

Further, in a configuration where a storage section that can hold an article can be attached to and detached from instead of the function section, it is possible to respond to user needs to use the space section 12 for storing article as well, and usability is improved.

In the printer 1 described above, the position of the end portion of the document table 14 in the +X direction, which is described with reference to FIG. 2, may be aligned with the position of the end portion in the +X direction of the recording paper of the maximum size that can be stored in the paper cassette 8. By being configured in this way, a much larger space section 12 can be secured.

In the printer 1 equipped with the storage section in the space section 12, the side surface of the storage section in the −X direction is flush with the side surface 2*b* of the scanner section 2, and the side surface 7*c* of the printer section 7 in the +X direction is flush with the side surface 2*c* of the scanner section 2. Therefore, the aesthetic appearance of the device can be improved.

Needless to say, this disclosure is not limited to the embodiments described above, and various variations are possible within the scope of this disclosure described in the claims, which are also within the scope of this disclosure.

What is claimed is:

1. A recording device comprising:

a recording unit having a recording section that performs recording on a medium;

a scanning unit that has a document table on which a document is placed and a scanning section that scans an image of the document placed on the document table, and that is located above the recording unit, wherein the recording unit has a medium accommodation section that stores the medium before the medium is fed and that is accessible from a first side surface, the medium accommodation section is configured to be attached to and detached from the recording unit, the first side surface is a front surface of the recording device and that left and right directions when viewing the first side surface from the front surface of the recording device are width directions of the recording device, a longitudinal direction of the document table is located along the width directions of the recording device, a size of the document table is larger than a size of the medium accommodation section in the width directions of the recording device, one direction of the width directions of the recording device is a first direction and a direction of the width directions different from the first direction is a second direction, a center position of the document table is shifted in the first direction with respect to a center position of the medium accommodation section in the width directions of the recording device, and the recording unit has a storage section, which is configured to store an article, in a first direction side of the medium accommodation section and below the scanning unit; and an open and close section that opens and closes the storage section, wherein the open and close section is configured to be lockable, and the open and close section is configured to:

engage with the medium accommodation section; and lock the medium accommodation section in an attached state when the open and close section is closed.

2. The recording device according to claim 1, wherein multiple types of storage sections with different structures are configured to be attached to and detached from the recording unit.

3. The recording device according to claim 2, wherein a function section that performs a predetermined function is configured to be attached to and detached from the recording unit instead of the storage section.

4. The recording device according to claim 1, further comprising:

a liquid container that is configured to contain liquid to be ejected from the recording section, wherein the liquid container is exposed on the first side surface, the liquid container is configured to be attached to and detached from the recording unit, and the open and close section is configured to engage with the liquid container and, when closed, locks the liquid container in the attached state.

5. The recording device according to claim 1, wherein in the width directions of the recording device, a position of an end portion of the document table in the second direction is aligned with a position of an end portion of a maximum size medium, which is capable of being stored in the medium accommodation section in the second direction.

6. The recording device according to claim 5, wherein a side surface of the storage section in the first direction is flush with a side surface of the scanning unit, and a side surface of the recording unit in the second direction is flush with the side surface of the scanning unit.

7. A recording device comprising:

a recording unit having a recording section that performs recording on a medium; and a scanning unit that has a document table on which a document is placed and a scanning section that scans an image of the document placed on the document table, and that is located above the recording unit, wherein the recording unit has a medium accommodation section that stores the medium before the medium is fed and that is accessible from a first side surface, the first side surface is a front surface of the recording device and that left and right directions when viewing the first side surface from the front surface of the recording device are width directions of the recording device, a longitudinal direction of the document table is located along the width directions of the recording device, a size of the document table is larger than a size of the medium accommodation section in the width directions of the recording device, one direction of the width directions of the recording device is a first direction and a direction of the width directions different from the first direction is a second direction, a center position of the document table is shifted in the first direction with respect to a center position of the medium accommodation section in the width directions of the recording device, and the recording unit has a function section that performs a predetermined function in a first direction side of the medium accommodation section and below the scanning unit, wherein the function section is a stapler provided on a bottom surface of the scanning unit, and has an opening provided at a position that overlaps with a corner of the scanning unit when viewed from above.

8. The recording device according to claim 7, wherein multiple types of function sections with different functions are configured to be attached to and detached from the recording unit.

9. The recording device according to claim 8, wherein a storage section, which is configured to store an article, is configured to be attached to or detached from the recording unit instead of the function section.

* * * * *